(12) United States Patent
Sakata (10) Patent No.: US 7,443,838 B2
(45) Date of Patent: Oct. 28, 2008

(54) MOBILE COMMUNICATIONS SYSTEM AND OPERATION CONTROL METHOD, AND NODE AND WIRELESS CONTROL APPARATUS THEREFOR

(75) Inventor: Masayuki Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 1073 days.

(21) Appl. No.: 10/648,382

(22) Filed: Aug. 27, 2003

(65) Prior Publication Data

US 2004/0043793 A1 Mar. 4, 2004

(30) Foreign Application Priority Data

Aug. 28, 2002 (JP) ............................. 2002-248040

(51) Int. Cl.
*H04L 12/66* (2006.01)
(52) U.S. Cl. ................. 370/352; 370/353; 370/354; 370/355; 370/356; 370/357; 370/358
(58) Field of Classification Search ................. 370/352, 370/353, 354, 355, 356, 357, 358
See application file for complete search history.

(56) References Cited

U.S. PATENT DOCUMENTS

2003/0003919 A1* 1/2003 Beming et al. ............... 455/446

FOREIGN PATENT DOCUMENTS

| GB | 2 367 206 | 3/2002 |
|---|---|---|
| JP | 2000-151807 | 5/2000 |
| JP | 2002-044740 | 2/2002 |
| JP | 2004-511131 | 4/2004 |
| WO | WO 00/70893 | 11/2000 |
| WO | WO 01/03454 | 1/2001 |
| WO | WO 02/28014 | 4/2002 |

OTHER PUBLICATIONS

European Search Report dated Jan. 26, 2004.
Japanese Office Action dated Mar. 6, 2007 with English translation.
Lunt Yorgen, Specialized Interface Telecommunications in a UMTS (1999), pp. 54-56.

* cited by examiner

Primary Examiner—Quynh H Nguyen
(74) Attorney, Agent, or Firm—Whitham Curtis Christofferson & Cook, PC (57) ABSTRACT

A normal audio communication terminal can use the VoIP technology in a mobile communications system by using an audio communication circuit for a conventional wireless circuit, and adding an audio communications function to a packet communication device. In a PS (packet switching) network side forming a core network in the mobile communications system, the signaling of a CS (circuit switching) call with an RNC is designed to control a CS-UP (CS side user plane) by communications with the CPU of an SGSN, and the user data relating to a CS call is designed for communications with a PSTN (public switch telephone network) by way of an MGW through the CS-UP. Thus, an audio communication function can be added to a packet communication device, thereby realizing a VoIP function to a wireless circuit using an audio communications circuit.

17 Claims, 9 Drawing Sheets

MOBILE COMMUNICATIONS SYSTEM AND OPERATION CONTROL METHOD, AND NODE AND WIRELESS CONTROL APPARATUS THEREFOR

BACKGROUND OF THE INVENTION

1. Field of the Invention

The present invention relates to a mobile communications system and an operation control method therefor, and a node and a wireless control apparatus for use in the system and method, and more specifically to a mobile communications system using a VoIP (voice over Internet protocol) technology and an operation control method therefor, and a node and a wireless control apparatus for use in the system and method.

2. Description of the Related Art

The core network in the current mobile communications system separately includes a CS (Circuit Switched) network which is a network for audio communications and has a circuit switched function, and a PS (Packet Switched) network which is a network for packet communications and has a packet switched function. The core network is standardized by the 3GPP (3rd generation partnership project), and indicated by a function block as shown in FIG. 8.

Figure 8:
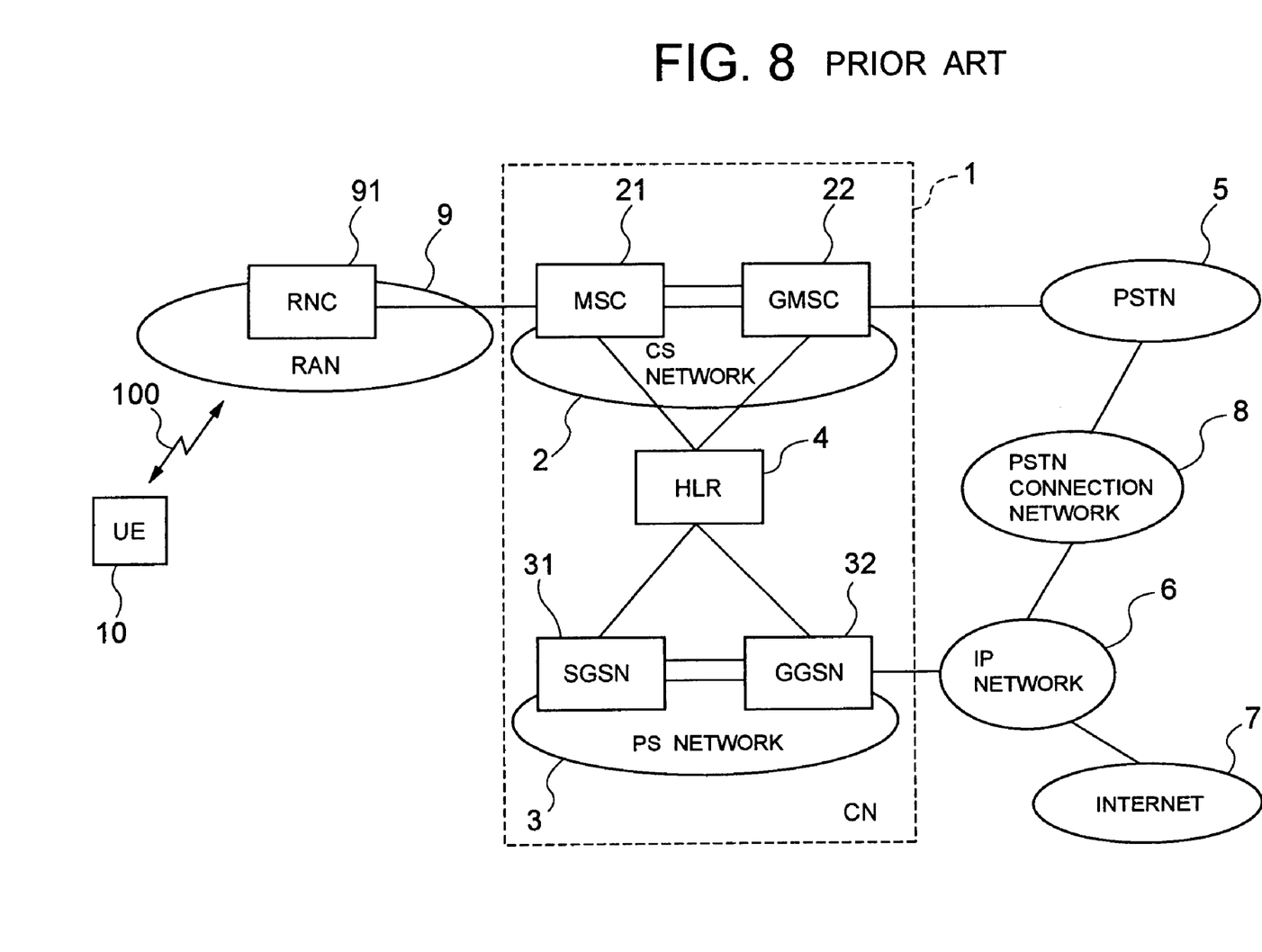
FIG. 8 is a block diagram of the outline of the conventional mobile communications system.

In FIG. 8, a core network (CN) 1 includes a CS network 2 and a PS network 3. The CS network 2 includes an MSC (mobile-services switching center) 21 having a circuit switched function and a GMSC (gateway MSC) 22 having a gateway function. The PS network 3 includes an SGSN (serving GPRS (global packet radio service) support node) 31, and a GGSN (gateway GPRS support node) 32 having a gateway function. The core network 1 is provided with an HLR (home location resister) 4 for management of the position of a mobile communications unit (user equipment (UE)) 10, and the HLR 4 can be accessed by the MSC, GMSC, SGSN, and GGSN.

An RAN (radio access network) 9 is provided between the core network 1 and the user equipment 10, and the RAN 9 includes an RNC (radio network controller) 91 which is a wireless control apparatus. A wireless bearer 100 is provided between a Node B (not shown in the attached drawings) which is a wireless base station in the RAN 9 and the UE 10 so that audio and packet communications can be performed.

The CS network 2 of the core network 1 is connected to a PSTN (public switched telephone network) 5. The PS network 3 is connected to the Internet 7 through an IP (Internet protocol) network 6 (or directly). The PS network 3 is connected to the PSTN 5 through the IP network 6 and a PSTN connection network 8. The PSTN connection network 8 includes equipments for realizing a fixed telephone network VoIP which is currently put to practical use.

Figure 9:
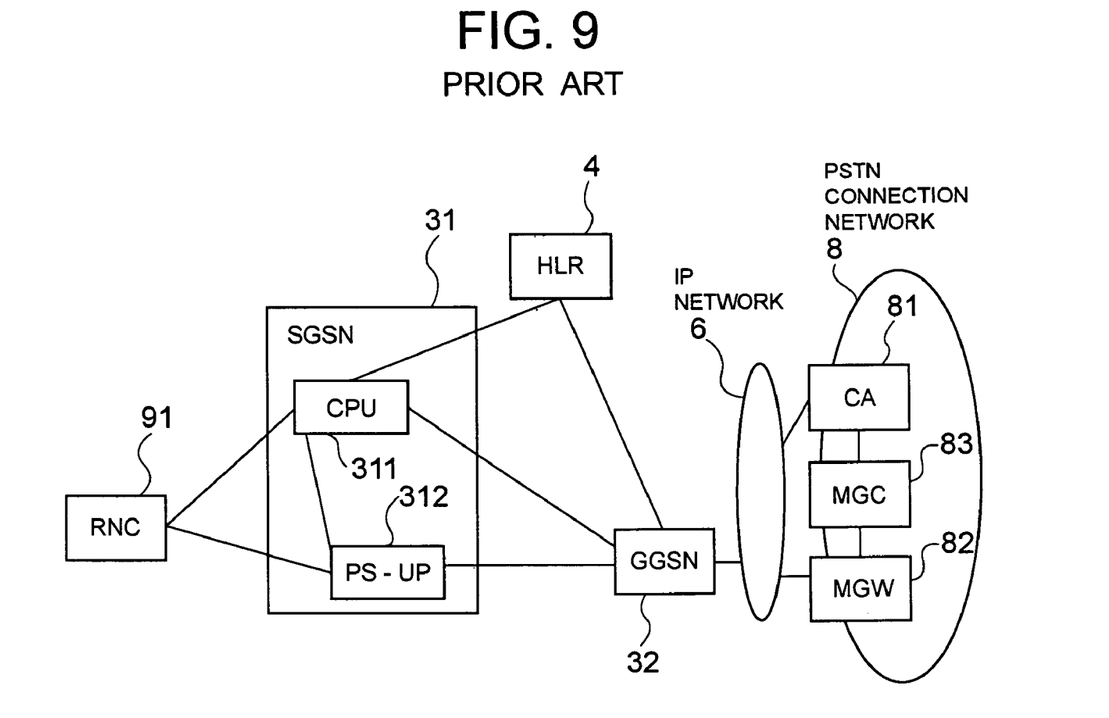
FIG. 9 is a block diagram of the SGSN and the peripherals shown in FIG. 8.

FIG. 9 is a block diagram showing the SGSN 31 and the GGSN 32 forming the PS network 3 in the core network 1 and the peripheral equipments shown in FIG. 8. The SGSN 31 includes a CPU (also referred to as a CP which is short for a call processor) 311 as a control device for controlling signaling on a PS call, and a PS-UP (PS side user plane device) 312 for processing control on user data relating to the PS call. The CPU 311 controls signaling on the PS call, communicates a signaling with the RNC 91 and the GGSN 32 to control the PS-UP 312. The PS-UP 312 communicates user data with the RNC 91 and the GGSN 32 under the control of the CPU 311.

The PSTN connection network 8 also realizes the fixed telephone network VoIP as described above. To attain this, it includes a CA (call agent) 81, an MGC (media gateway controller) 83, an MGW (media gateway) 82, etc. The CA 81 controls a call, the MGW 82 transcodes between IP side audio data and PSTN side audio data, and the MGC 83 controls the MGW 82 based on the control by the CA 81.

In the mobile communications system having the above-mentioned system architecture, the technology of realizing a VoIP using a PS network which is a network for packet communications has been investigated. There also is the technology of connecting a PLMN (public land mobile network) IP core between the RNC and the MGW in the mobile communications system to realize a VoIP so that the real-time traffic from a mobile unit can be routed using the PLMNIP core and a VoIP of the mobile unit can be realized without passing through a GGSN which is a gateway for a GPRS (for example, Japanese Patent Application Laid-Open No. 2002-44740).

The VoIP technology currently put to practical use using the PSTN connection network 8 shown in FIGS. 8 and 9 is not intended for a mobile unit, but for a fixed telephone network VoIP using a fixed telephone, and the application of the VoIP technology is being investigated in the mobile communications system using the mobile communications unit as described above. In this case, the VoIP is realized using the PS network shown in FIG. 8. However, since the RAN 9 and the PS network 3 which are mobile communications networks are simple access networks connected to the IP network 6, they cannot determine whether a call from the user equipment 10 is for data communications or VoIP communications.

Additionally, in this case, a packet communications circuit is used as a wireless circuit with which the wireless bearer 100 is set between the user equipment 10 and the RAN 9. However, using a packet communications circuit as a wireless circuit causes the problems that the use efficiency of the wireless circuit is lowered and that it is difficult to control the band of the wireless circuit.

The reasons for the above-mentioned problems are described below. That is, when the wireless circuit is connected from the user equipment 10 and terminated by the RNC 91 through the Node B in the RAN 9 (base station not shown in the attached drawings), a band of a maximum of 12.2 kbps and a band for headers per user are reserved in the audio communications using the CS network 2. If the traffic of mobile units concentrates on one area, a method of increasing the number of available mobile units is used with the band per user limited. When the PS network 3 is used, the available band possibly varies constantly because some user uses various bands. Furthermore, if there are users who transfer a large volume of data, there can be the possibility that available bands are constantly very narrow. Although in the current technology, when the PS network is used, there are some services such as transmitting data without delay, without error, with best effort, etc. depending on the class of each service called QoS (quality of service), the fine band control of a wireless circuit which can be performed using the CS network cannot be realized.

The technology disclosed by Japanese Patent Application Laid-open No. 2002-44740 is intended for realizing a VoIP of a mobile communications unit by providing a PLMNIP core between an RNC and an MGW, but does not disclose in detail a practical example of realizing the VoIP, etc., and does not clearly describe whether or not it uses a packet communications circuit as a wireless circuit, thereby leaving the above-mentioned problems unsolved.

SUMMARY OF THE INVENTION

The present invention aims at providing a mobile communications system capable of utilizing the VoIP technology by using a circuit for audio communications as a wireless circuit and adding an audio communicating function to an apparatus for packet communications without amending the current mobile communications unit.

The mobile communications system according to the present invention includes a wireless control apparatus connected to a mobile communications unit, and a node which is connected to the wireless control apparatus and provided on a packet switching (PS) network side configuring a core network, and has a packet processing capability. The node includes PS user data processing means for controlling user data relating to a PS call of the mobile communications unit, CS user data processing means for controlling user data relating to a CS (circuit switching) call of the mobile communications unit, and control means for controlling the PS and CS user data processing means by controlling signaling relating to the PS call and the CS call.

The node according to the present invention is connected to a wireless control apparatus connected to a mobile communications unit and provided on a packet switching (PS) network side configuring a core network of a mobile communications system, and has a packet processing capability. The node includes PS user data processing means for controlling user data relating to a PS call of the mobile communications unit, CS user data processing means for controlling user data relating to a CS (circuit switching) call of the mobile communications unit; and control means for controlling the PS and CS user data processing means by controlling signaling relating to the PS call and the CS call.

The operation control method according to the present invention is an operation control method for a mobile communications system having a wireless control apparatus connected to a mobile communications unit, and a node which is connected to the wireless control apparatus and provided on a packet switching (PS) network side configuring a core network, and has a packet processing capability. The node includes a PS user data processing step of controlling user data relating to a PS call of the mobile communications unit, a CS user data processing step of controlling user data relating to a CS (circuit switching) call of the mobile communications unit, and a control step of controlling signaling relating to the PS call and the CS call.

The wireless control apparatus according to the present invention is connected in a mobile communications system to a mobile communications unit and a node which is provided between the wireless control apparatus and an IP network and on a packet switching (PS) network side forming a core network, has a packet processing capability, and includes PS user data processing means for controlling user data relating to a PS call of the mobile communications unit, CS user data processing means for controlling user data relating to a CS (circuit switching) call of the mobile communications unit, and control means for controlling the PS and CS user data processing means by controlling signaling relating to the PS call and the CS call. A connection request relating to the CS call from the mobile communications unit includes information about a connection through the IP network, and means for detecting the information and connecting the CS call to the node is included.

The record medium according to the present invention is used to direct a computer to perform an operation of a node which is connected to a wireless control apparatus connected to a mobile communications unit and provided on a packet switching (PS) network side configuring a core network of a mobile communications system, and has a packet processing capability including a PS user data processing step of controlling user data relating to a PS call of the mobile communications unit, a CS user data processing step of controlling user data relating to a CS (circuit switching) call of the mobile communications unit, and a control step of controlling signaling relating to the PS call and the CS call.

The operations according to the present invention are described below. On the PS (packet switching) network side configuring the core network in a mobile communications system, the signaling control between RNC (wireless control apparatus) relating to a CS (circuit switching) call is performed by controlling the CS-UP (user plane on the CS side) through the communications by the CPU on the SGSN, and the user data relating to a CS call is designed to be communicated through the PSTN (public switched telephone network) through a MGW (media gateway) through the CS-UP. Thus, the audio communications function can be added to the packet communications apparatus, thereby realizing the VoIP function while using the audio communications circuit as a wireless circuit.

DETAILED DESCRIPTION OF THE PREFERRED EMBODIMENTS

Figure 1:
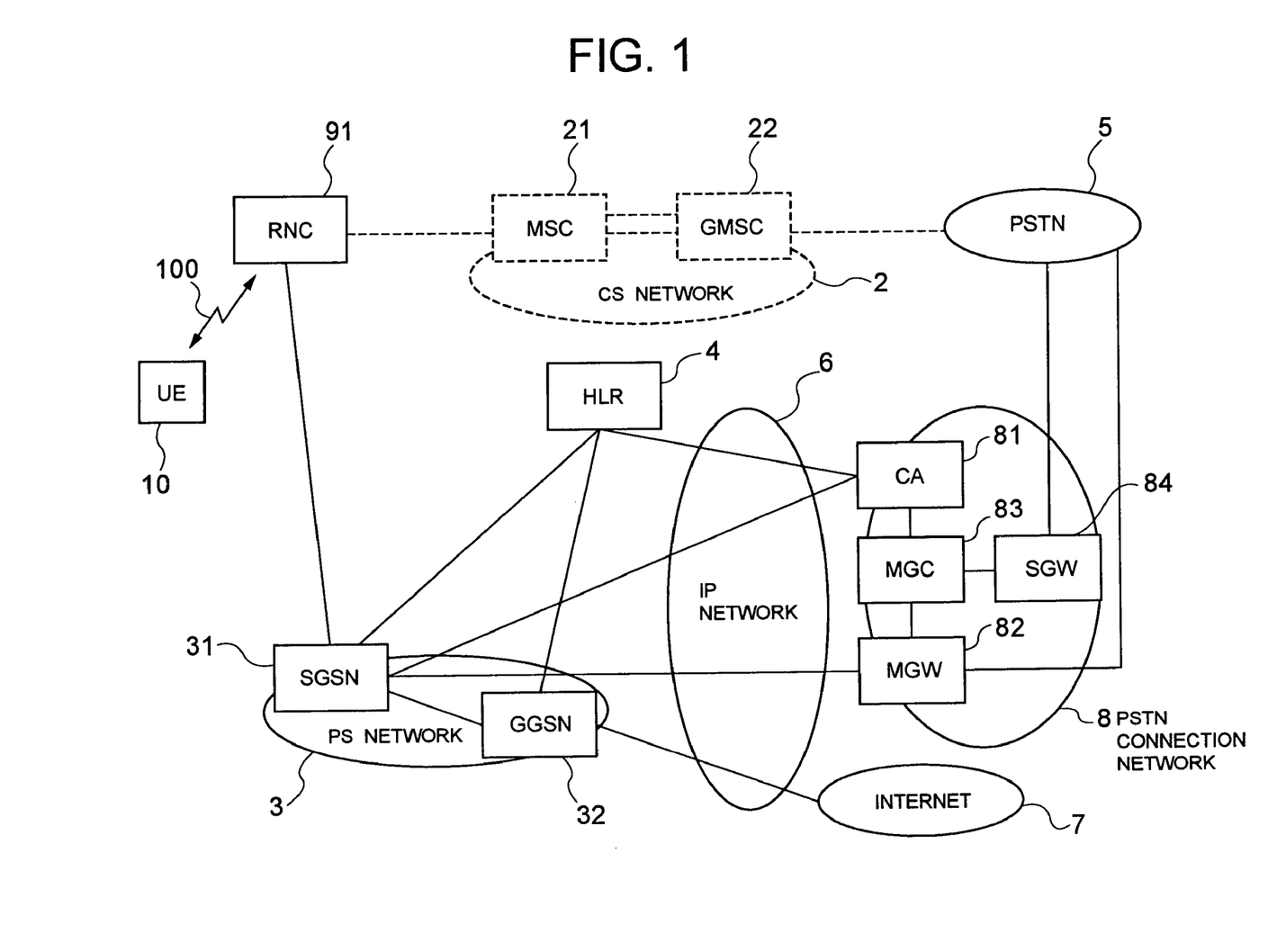
FIG. 1 is a block diagram of the outline of the system according to an embodiment of the present invention.

The embodiments of the present invention are described below by referring to the attached drawings. FIG. 1 is a block diagram of the outline of the system according to an embodiment of the present invention. In FIG. 1, the components also shown in FIG. 8 are assigned the same reference numerals. In the present invention, when the VoIP technology is applied to the mobile communications system, the wireless bearer 100 between the user equipment 10 and the RNC 91 is used as a current audio communications circuit. In the RNC 91, all calls generated from the user equipment 10 are tranmitted to the PS network 3. In the SGSN 31 in the PS network 3, the PS call is connected to the GGSN 32 as in the conventional method, signaling relating to the CS call is connected to the CA 81 in the PSTN connection network 8 to control the MGW 82 through the MGC 83. Then, the user data relating to the CS call is connected from the SGSN 31 to the PSTN 5 through the MGW 82.

The CA 81, the MGW 82, the MGC 83, and an SGW (signaling gateway) 84 form the PSTN connection network 8, and is a device for realizing the conventional fixed telephone network VoIP. The CA 81 controls a call using a signaling protocol such as H.323, SIP (session initiation protocol), etc., and controls the MGC 83.

The SGW 84 is used for transforming between a No. 7 protocol and IP. The No. 7 protocol is a signaling system for communication of telephone numbers, with switches used in the conventional fixed telephone network, and is also referred to as a common channel signaling system. The SGW 84 also relays an ISUP (ISDN user part) signal which is one of a user portion of a No. 7 common channel signal used in the ISDN. The MGW 82 has the CODEC function for mutual conversion (transcodation) between IP side audio data and PSTN side audio data. These CA, MGC, MGW, SGW, etc. forming the PSTN connection network 8 are well-known devices, and are not described here in detail.

In the conventional mobile communications system, the CS network 2 is provided between the RNC 91 and the PSTN 5 as indicated by the dotted lines shown in FIG. 1 (refer to FIG. 8) to control the connection of a CS call relating to the user equipment 10. In the present invention, the connection control of the CS call and the PS call relating to the user equipment 10 are performed only by the PS network 3 without the CS network 2.

The RNC 91 transmits signaling with the SGSN 31 in the PS network 3 regardless of a CS call or a PS call, and sets a path. The SGSN 31 terminates the signaling of the CS call, and connects the PS call to the GGSN as in the conventional method. The CS call is connected to the CA 81 using a protocol such as the signaling used as a VoIP, for example, the H.323, the SIP, etc.

Figure 2:
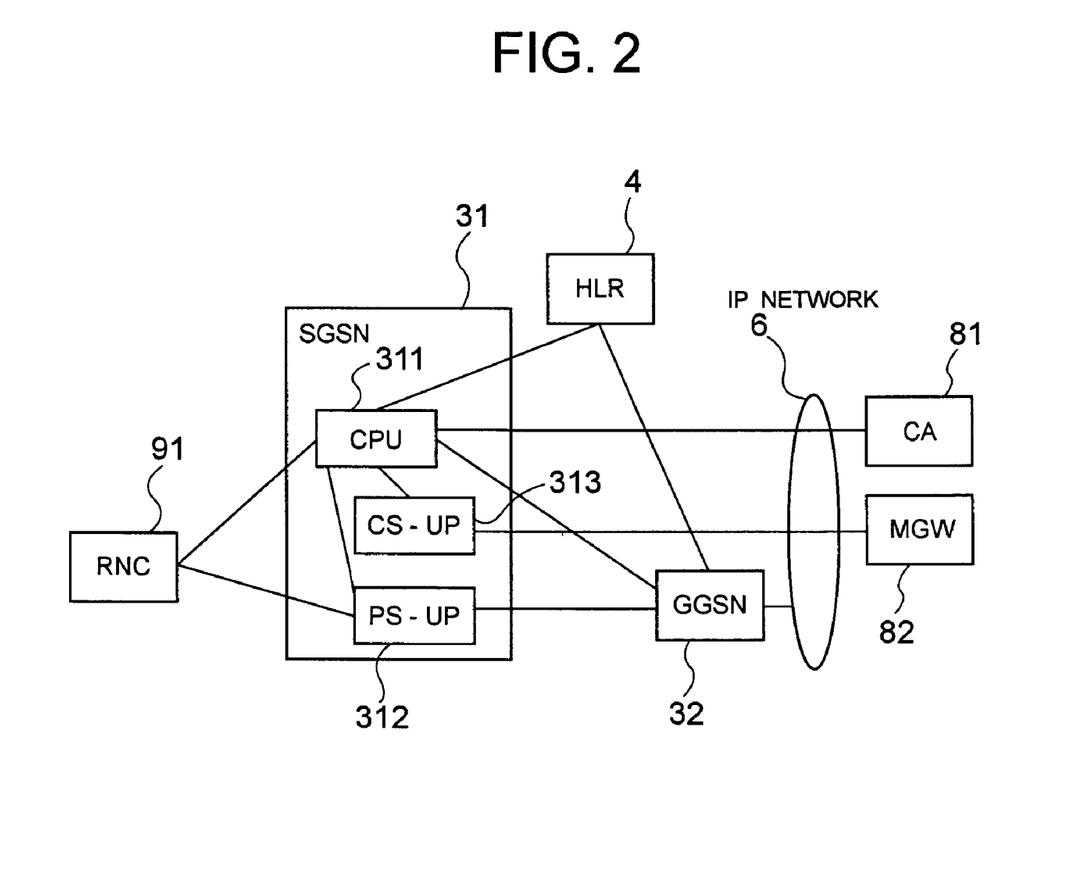
FIG. 2 is a block diagram of the SGSN and the peripherals shown in FIG. 1.

FIG. 2 is a block diagram of the SGSN 31 functional block and the peripheral devices, and corresponds to the conventional technology shown in FIG. 9. The components also shown in FIG. 9 are assigned the same reference numerals. In FIG. 2, the SGSN 31 comprises the CPU 311, the PS-UP 312, and a CS-UP 313. The CPU 311 controls the signaling of the CS call and the PS call. The signaling on the PS call is communicated with the RNC 91 and the GGSN 32 as in the conventional method, and controls the PS-UP (PS side user plane device) 312 for controlling the processing of user data.

The PS-UP communicates user data with the RNC 91 and the GGSN 32 as in the conventional method. For a CS call, the CPU 311 communicates with the RNC 91, and controls the CS-UP (CS side user plane device) 313.

Figure 3:
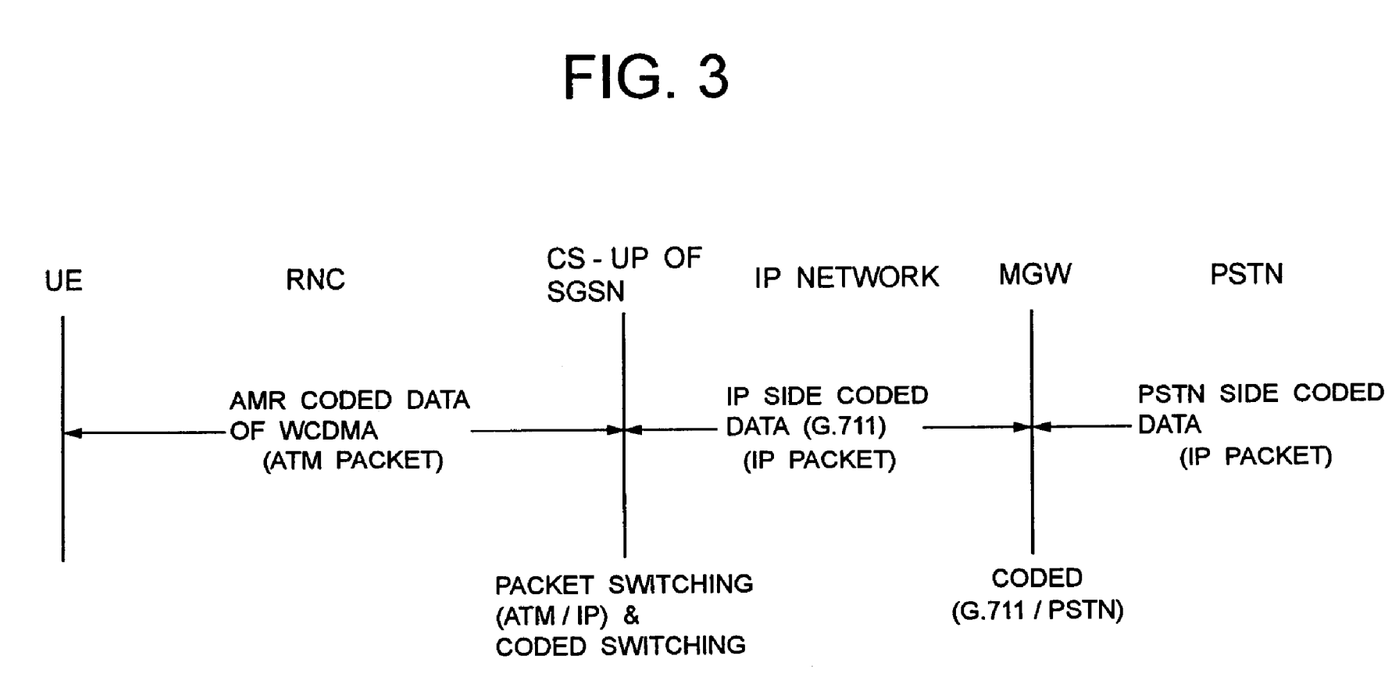
FIG. 3 shows an example of an audio coding system in each domain, and a CODEC function of each device located at the boundary of the domain of the system block shown in FIG. 1.

The CS-UP 313 controls the processing of user data in a CS call, and has the CODEC function for converting the audio coding technology (AMR (adoptive multi-rate) in the W-CDMA) for use in the mobile communications unit and the audio coding technology (for example, G. 711) of the MGW 82 for use in the conventional VoIP. FIG. 3 shows an example of the audio coding system in each unit (domain) shown in FIG. 1 and the CODEC function of each device located on the domain boundary.

As shown in FIG. 3, the data from the user equipment (UE) to the SGSN through the RNC is, for example, the data (ATM packet) in the AMR coding system of the W-CDMA, and the data from the SGSN to the MGW through the IP network is the data (IP packet) in the IP side coding system (for example, G. 711). The data from the MGW to the PSTN side is the data (IP packet) in the PSTN side coding system. Therefore, the CS-UP 313 of the SGSN 31 has the CODEC for converting the user data of a CS call from the RNC side coding system (for example, AMR) to the IP side coding system (for example, G. 711), and vice versa, and has the converting function between an ATM packet and an IP packet.

It is assumed that the MGW 82 has the CODEC for converting use data in a CS call from the IP side coding system (for example, G. 711) to the PSTN side coding system, and vice versa.

Figure 4:
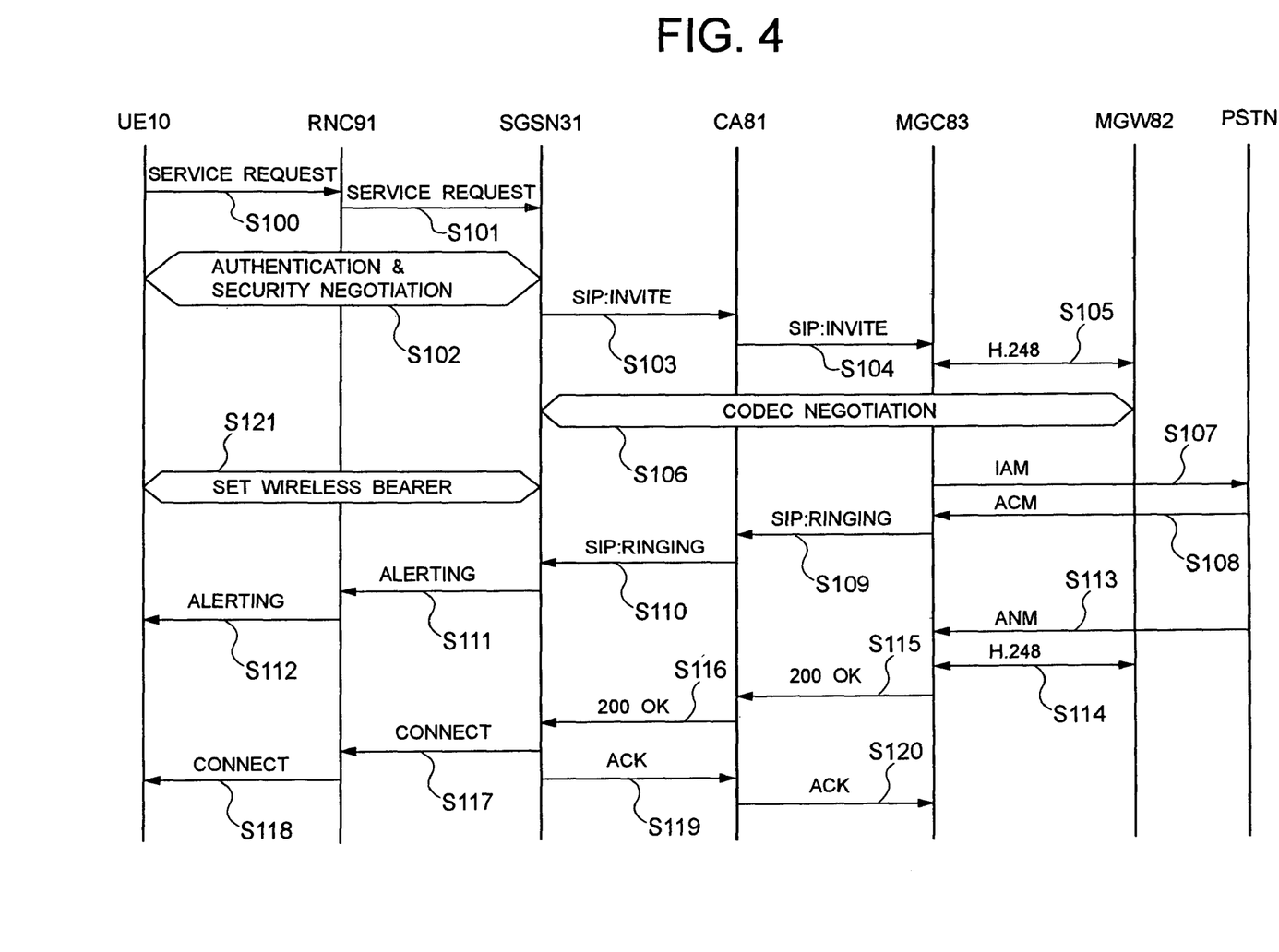
FIG. 4 shows an example of a CS call sequence according to an embodiment of the present invention.
Figure 5:
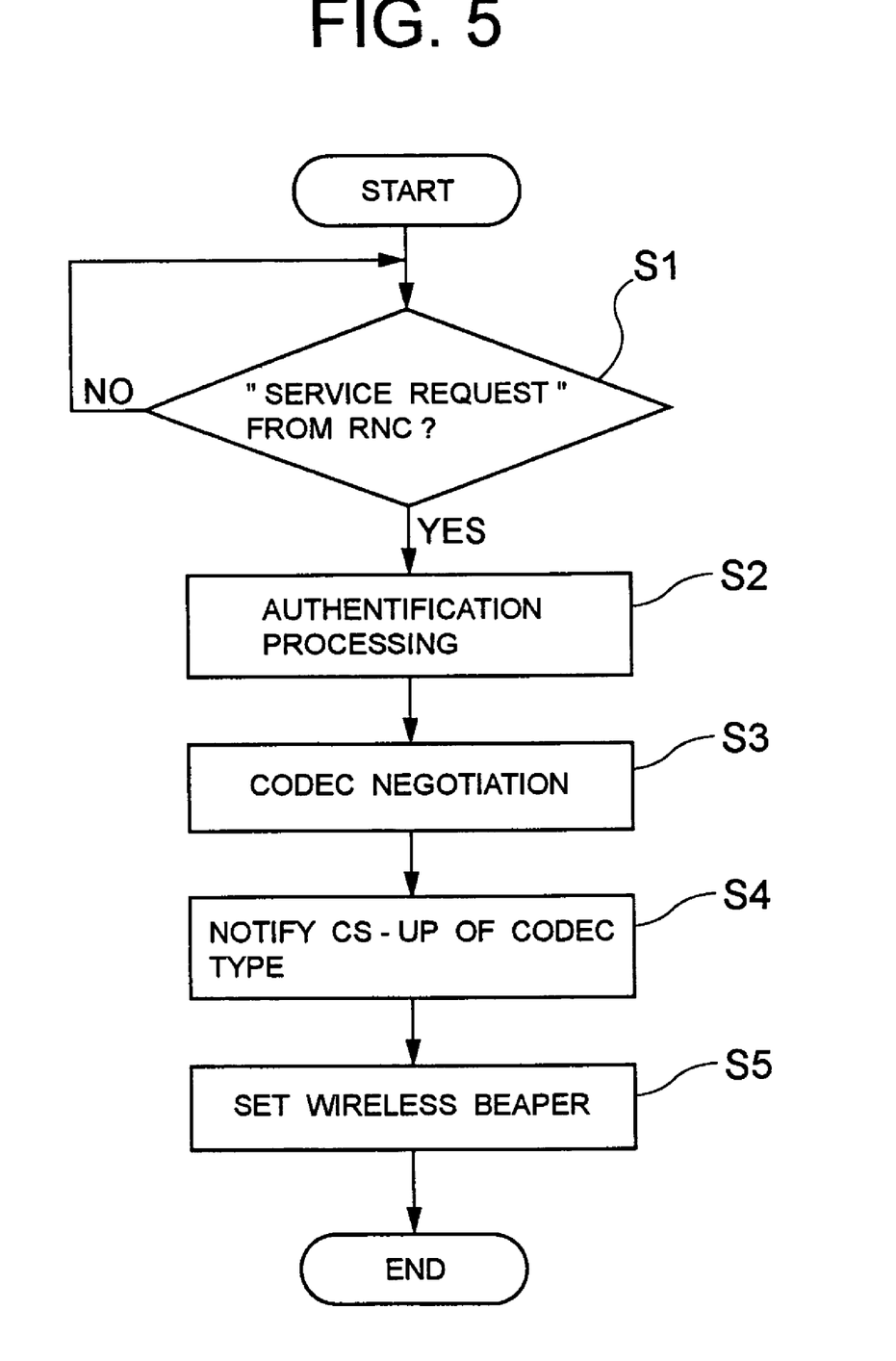
FIG. 5 shows the flow of the operations of the CPU 311 in the SGSN.

FIG. 4 shows the operations according to an embodiment of the present invention, and shows the sequence processing a call generated from the user equipment (UE) 10 to the PSTN 5. In the present embodiment, the SIP is used as a signaling protocol, but it is obvious that another protocol such as the H. 323, etc. can be used. FIG. 5 shows the flow of the signaling process in the CPU 311.

First, the user equipment (UE) 10 transmits "Service Request" which is a call connection request to the RNC 91 (step S100). In the signaling of the call connection request, it is assumed that the information about the use of the VoIP (that is, the information indicating the connection through the IP network 6) is added to a predetermined bit of the ATM header. The RNC 91 checks the bit, and transmits "Service Request" to the SGSN 31 when it indicates the use of the VoIP (step S101).

Upon receipt of "Service Request" (step S1), the CPU 311 of the SGSN 31 authenticates the UE 10 and performs the security processing with the UE 10 (step S2, S102), and transmits "SIP: INVITE" as a notification to the CA 81 of the type of CODEC for CODEC negotiation (step S103). Upon receipt of "SIP:INVITE", the CA 81 transmits it to the MGC 83 (step S104). The MGC 83 controls the MGW 82 by the protocol such as the H. 248 (step S105), and the CODEC negotiation is made between the SGSN 31 and the MGW 82 (step S3, S106). Through the CODEC negotiation, a necessary CODEC type is determined between the CS-UP 313 of the SGSN 31 and the MGW 82 (step S4). A wireless bearer is set between the UE 10 and the RNC 91 (step S5, S121).

Then, the MGC 83 transmits "ISUP:IAM" which is a connection request to the PSTN 5 (step S107), the PSTN 5 returns "ISUP:ACM", and a call is held (step S108). Then, the MGC 83 transmits "SIP:Ringing" as a call to the CA 81 and the SGSN 31 (step S109, S110), and the SGSN 31 transmits "ALERTING" which is the signaling for use in a CS call to the RNC 91 and the UE 10 (step S111, S112).

When the PSTN 5 starts generating a call, "ANM" indicating connection completion is transmitted to the MGC 83 (step S113), and the MGC 83 notifies the MGW 82 of it by "H.248" (step S114). Then, the MGC 83 transmits "200OK" indicating connection acknowledgement to the CA 81 and the SGSN 31 (step S115, S116).

Then, the SGSN 31 transmits "CONNECT" which is the signaling for use in a CS call to the RNC 91 and the UE 10 (step S117, S118). Simultaneously, the SGSN 31 transmits "ACK" for acknowledgement to the CA 81 (step S119), and the CA 81 also transmits "ACK" to the MGC 83 (step S120). Thus, a call is started between the UE 10 and the PSTN 5.

Figure 6:
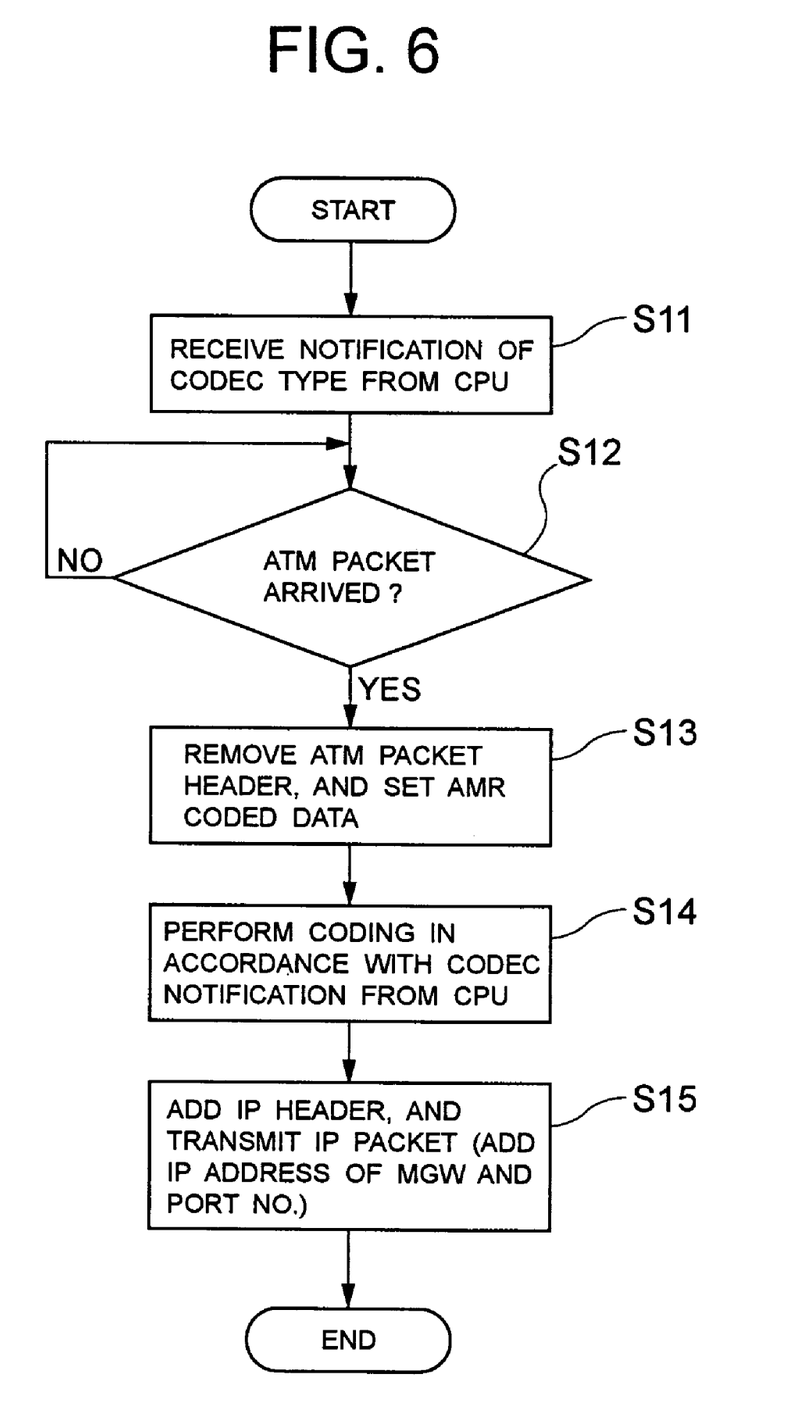
FIG. 6 shows the flow of the operations of the CS-UP 313 in the SGSN.

FIG. 6 is a flowchart of the operations of the CS-UP 313 in the SGSN 31, and shows the operation for processing user data of a CS call. In FIG. 6, upon receipt of a notification of the type of CODEC from the CPU 311 in step S4 shown in FIG. 5 (step S11), the CS-UP 313 awaits an arrival of an ATM packet from the RNC 91 (step S12). In response to the rrival of the ATM packet, the CS-UP 313 removes (terminates) the header portion of the ATM packet, thereby leaving the user data alone. That is, in the case of the W-CDMA, the AMR coded data is left alone (step S13). Simultaneously, the CS-UP 313 makes its own CODEC match the CODEC indicated by the CPU 311 (step S14). Then, it adds the IP header to the user data, and transmits the result as an IP packet. At this time, the IP address of the MGW and the port number are added to the IP header (step S15).

As described above, the CS call from the user equipment (UE) 10 is connected to the PSTN through the PS network using the VoIP technology, but the sequence processing the CS call from the PSTN 5 to the UE 10 can be performed in the reverse order.

In the above-mentioned embodiment, the CS network 2 indicated by the dotted lines shown in FIG. 1 is not used, but the CS network 2 can be used as in the existing system so that a packet can be connected using the VoIP through the above-mentioned PS network 3 if the information bit indicating the use of the VoIP in the ATM header in the signaling of "Service Request" which is a call connection request from the UE 10 is set to "1". If the bit is not set to "1", then the circuit can be connected through the existing CS network 2. In this case, the switch control between the CS network and the PS network is performed by the RNC 91.

According to the above-mentioned embodiment of the present invention, the VoIP technology can also be used for the mobile communications system with the audio circuit applied without a packet circuit as a wireless circuit. In this case, the mobile communications unit which is a terminal unit can be used with the information about the use of the VoIP technology added to the ATM header unit, thereby utilizing the conventional audio terminal almost as it is.

Figure 7:
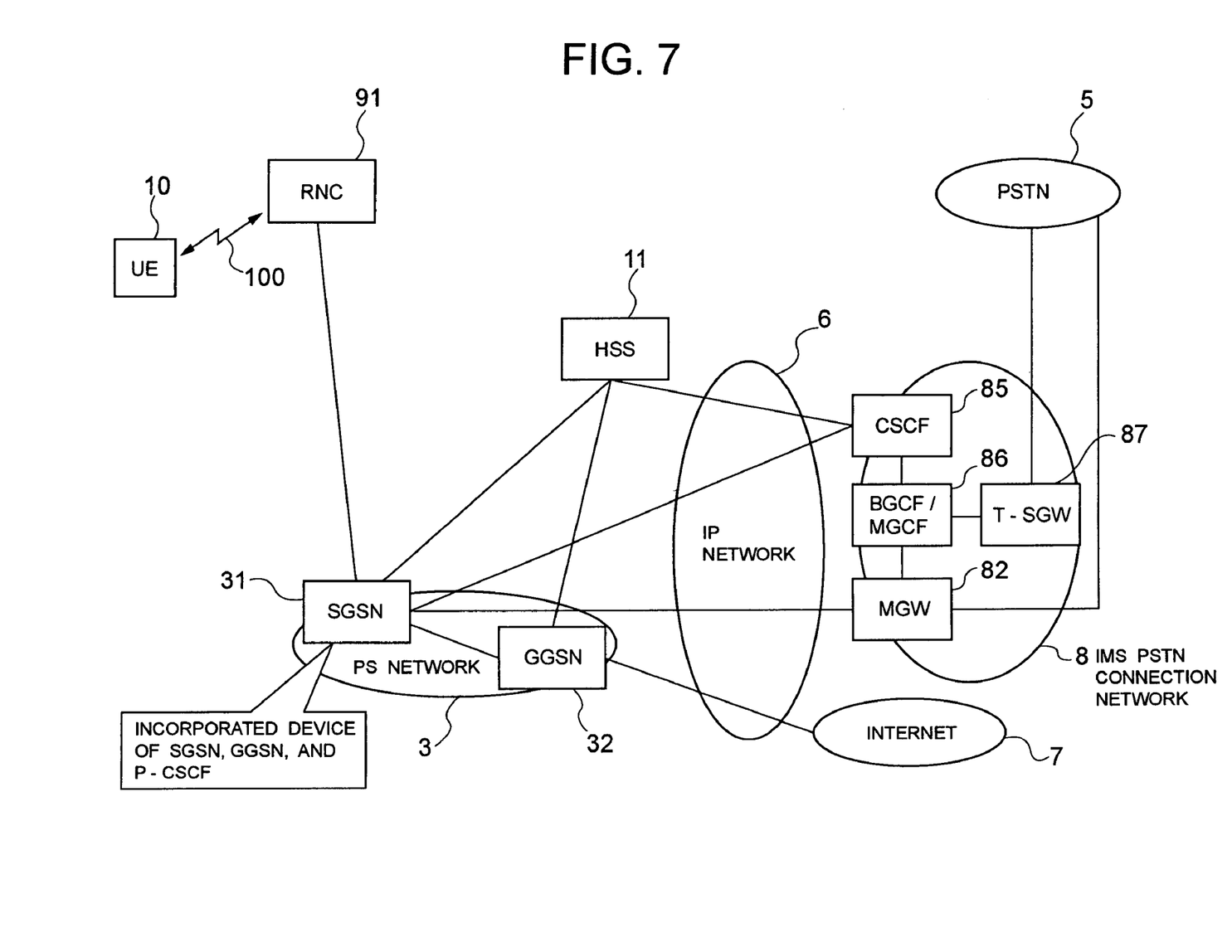
FIG. 7 is a block diagram of the outline of the system according to another embodiment of the present invention.

FIG. 7 is a block diagram of the outline of another embodiment of the present invention, and shows the configuration of the present invention applied to the network of the IMS (IP multimedia subsystem) which is the standard specifications of Release 5 of the 3GPP. In FIG. 7, the components also shown in FIG. 1 are assigned the same reference numerals.

"IMS" refers to a subsystem for providing an IP multimedia application. For example, it provides audio communications, a real-time multimedia application, an online white board, etc.

In the IMS, the HLR 4 corresponds to an HSS (home subscriber service) 11, the CA 81 corresponds to a CSCF (call state control function) 85, the MGC 83 corresponds to a BGCF (breakout gateway control function)/MGCF (media gateway control function) 86, the SGW 84 corresponds to a protocol switch device (T-SGW) 87 provided between the PSTN 5 and the MGC 83. It is assumed that the SGSN shown in FIG. 7 is a device obtained by incorporating the SGSN, the GGSN, and the P-CSCF (proxy CSCF) in the IMS.

Thus, using the SGSN 31 according to the present invention, the IMS can be applied using an audio circuit in the wireless region 100. In the standardized IMS, the UE 10 and the CSCF 85 directly communicate the SIP. However, with the configuration of the present invention, the SGSN and the CSCF communicate the SIP using the CS call signaling of the UE between the UE and SGSN. Therefore, by replacing the CA shown in FIG. 4 with the CSCF, the sequence shown in FIG. 4 is similarly applied to the system shown in FIG. 7.

It is obvious that the operation flows shown in FIGS. 5 and 6 can be stored on a record medium as a program, and can be read by a computer for execution.

The first effect of the present invention is that the VoIP technology can be applied without lowering the use efficiency of the wireless circuit in the mobile communications system or deteriorating the audio quality. Generally, there occurs audio deterioration when a packet circuit is used as a wireless circuit because the use efficiency of the wireless circuit is low or it is difficult to control the band of the wireless circuit. However, according to the present invention, an audio circuit is used as a wireless circuit. Therefore, the above-mentioned problem does not occur, and the efficiency and the audio quality of the wireless circuit can be improved.

The second effect of the present invention is that the VoIP technology can be used with an existing audio terminal (mobile communications terminal) because the VoIP technology can be used through an audio circuit without a packet circuit, thereby requiring no development of a new terminal for a wireless circuit.

The third effect of the present invention is that the cost of providing equipment can be largely reduced because, in the process of popularizing the VoIP technology in the future, a common carrier who starts new business can offer an audio communication service without establishing a CS network (MSC or GMSC).

The fourth effect of the present invention is that an IMS can be used through an audio circuit in a wireless region in addition to the IMS through a packet circuit in a normal wireless region in accordance with the standards.

What is claimed is:

1. A mobile communications system having a wireless control apparatus connected to a mobile communications unit, and a node connected to the wireless control apparatus and provided on a packet switching (PS) network side configuring a core network, wherein the node is arranged for packet processing, for packet switching communication with said PS network side, of circuit switching (CS) calls of the mobile communications unit and PS calls of the mobile communications unit, wherein
    the node comprises:
        PS user data processing unit configured to control user data relating to a PS call of the mobile communications unit;
        CS user data processing unit configured to control user data relating to a CS call of the mobile communications unit; and
        control unit configured to control said PS and CS user data processing units by controlling signaling relating to the PS call and the CS call.

2. The mobile communications system of claim 1, wherein:
    the node is located between the wireless control apparatus and an IP network; and
    said CS user data processing unit comprises a CODEC for performing mutual conversion between a coding system of user data on a wireless control apparatus side and a coding system on an IP network side.

3. The mobile communications system of to claim 2, wherein
    said CS user data processing unit comprises a mutual conversion unit configured to perform mutual conversion between a packet format of user data on the wireless control apparatus side and a packet format on the IP network side.

4. The mobile communications system of claim 2, wherein:
    a connection request relating to the CS call from the mobile communications unit includes connection information about a connection through the IP network; and
    the wireless control apparatus is configured to detect the connection information and, in response, to connect the CS call to the node.

5. A node connected to a wireless control apparatus connected to a mobile communications unit and provided on a packet switching (PS) network side configuring a core network of a mobile communications system, wherein the node is arranged for packet processing, for packet switching communication with said PS network side, of circuit switching (CS) calls of the mobile communications unit and PS calls of the mobile communications unit, comprising:
    PS user data processing unit configured to control user data relating to a PS call of the mobile communications unit;
    CS user data processing unit configured to control user data relating to a CS call of the mobile communications unit; and control unit configured to control said PS and CS user data processing units by controlling signaling relating to the PS call and the CS call.

6. The node of claim 5, wherein:
the node is located between the wireless control apparatus and an IP network; and
said CS user data processing unit comprises a CODEC for performing mutual conversion between a coding system of user data on a wireless control apparatus side and a coding system on an IP network side.

7. The node of claim 6, wherein
said CS user data processing unit comprises a mutual conversion unit configured to perform mutual conversion between a packet format of user data on the wireless control apparatus side and a packet format on the IP network side.

8. A wireless control apparatus connected to a mobile communications unit and a node which is provided between the wireless control apparatus and an IP network and on a packet switching (PS) network side forming a core network, wherein the node is arranged for packet processing, for packet switching communication with said PS network side, of circuit switching (CS) calls of the mobile communications unit and PS calls of the mobile communications unit and comprises:
PS user data processing unit configured to control user data relating to a PS call of the mobile communications unit;
CS user data processing unit configured to control user data relating to a CS call of the mobile communications unit; and
control unit configured to control said PS and CS user data processing unit by controlling signaling relating to the PS call and the CS call, wherein:
a connection request relating to the CS call from the mobile communications unit includes information about a connection through the IP network; and
a detector unit configured to detect the information and, in response, to connect the CS call to the node.

9. An operation control method for a mobile communications system having a wireless control apparatus connected to a mobile communications unit, comprising:
providing a node on a packet switching (PS) network side configuring a core network, the node configured for packet processing, for packet switching communication with said PS network side, of user data of a PS call of the mobile communications unit and for packet processing of user data of a circuit switching (CS) call of the mobile communications unit
performing, within the node, a PS user data processing controlling user data relating to a PS call of the mobile communications unit;
performing, within the node, a CS user data processing controlling user data relating to a CS call of the mobile communications unit; and
performing, within the node, a control controlling signaling relating to the PS call and the CS call.

10. The operation control method of claim 9, wherein:
the node is located between the wireless control apparatus and an IP network; and
the CS user data processing comprises performing mutual conversion between a coding system of user data on a wireless control apparatus side and a coding system on an IP network side.

11. The operation control method of claim 10, wherein
the CS user data processing step comprises performing mutual conversion between a packet format of user data on a wireless control apparatus side and a packet format on an IP network side.

12. The operation control method of claim 10, wherein:
a connection request relating to the CS call from the mobile communications unit includes information about a connection through the IP network and further comprising
detecting, within the wireless control apparatus, the information and, in response to the detecting, connecting the CS call to the node.

13. A tangible record medium encoded with a program that can be executed by a computer which is used to direct a computer to perform an operation of a node which is connected to a wireless control apparatus connected to mobile communications unit and provided on a packet switching (PS) network side configuring a core network of a mobile communications system, wherein the node is arranged for packet processing, for packet switching communication with said PS network side, of circuit switching (CS) calls of the mobile communication unit and PS calls from the mobile communication unit, the operation comprising:
a PS user data processing controlling user data relating to a PS call of the mobile communications unit;
a CS user data processing of controlling user data relating to a CS call of the mobile communications unit; and
a control controlling signaling relating to the PS call and the CS call.

14. The tangible record medium of claim 13, wherein:
the node is located between the wireless control apparatus and an IP network; and
the CS user data processing steps comprises performing mutual conversion between a coding system of user data on a wireless control apparatus side and a coding system on an IP network side.

15. The tangible record medium of according claim 14, wherein
the CS user data processing comprises performing mutual conversion between a packet format of user data on the wireless control apparatus side and a packet format on the IP network side.

16. The mobile communication system of claim 1, wherein the node is a SGSN (serving global packet service support node).

17. The node of claim 5, wherein the node is a SGSN (serving global packet service support node).

* * * * *